United States Patent
Van Overveld et al.

(10) Patent No.: US 6,804,415 B2
(45) Date of Patent: Oct. 12, 2004

(54) METHOD AND APPARATUS FOR PROVIDING AN IMAGE TO BE DISPLAYED ON A SCREEN

(75) Inventors: Cornelius Wilhelmus Antonius Marie Van Overveld, Eindhoven (NL); Johannes Bruijns, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 488 days.

(21) Appl. No.: 09/961,939

(22) Filed: Sep. 24, 2001

(65) Prior Publication Data

US 2002/0085119 A1 Jul. 4, 2002

(30) Foreign Application Priority Data

Sep. 27, 2000 (EP) .............................. 00203346

(51) Int. Cl.⁷ .................................................. G06K 9/32
(52) U.S. Cl. ......................................... 382/293; 348/51
(58) Field of Search ........................ 382/293, 295–297, 382/294, 276, 254; 345/419, 426, 427, 31, 582, 746, 747; 340/995.14, 995.1; 348/51, 157, 578, 147, 143; 359/13

(56) References Cited

U.S. PATENT DOCUMENTS

| | | | | |
|---|---|---|---|---|
| 4,956,706 A | * | 9/1990 | Ohba ........................... 348/578 |
| 5,367,614 A | * | 11/1994 | Bisey ........................... 345/419 |
| 5,574,836 A | * | 11/1996 | Broemmelsiek ............ 345/427 |
| 6,307,585 B1 | * | 10/2001 | Hentschke ................... 348/51 |
| 6,462,769 B1 | * | 10/2002 | Trowbridge et al. ........... 348/51 |

FOREIGN PATENT DOCUMENTS

| | | | |
|---|---|---|---|
| EP | 1071045 A1 | 7/2000 | ........... G06T/15/20 |
| WO | WO9622660 | 1/1996 | ........... H04N/13/04 |

* cited by examiner

*Primary Examiner*—Leo Boudreau
*Assistant Examiner*—Ishrat Sheral

(57) ABSTRACT

The invention relates to a method for providing an image to be displayed on a screen 10 such that a viewer in any current spatial position O in front of the screen 10 can watch the image with only a minimal perspective deformation. According to the invention this is achieved by estimating the current spatial position O of a viewer in relation to a fixed predetermined position Q representing a viewing point in front of the screen 10 from which the image could be watched without any perspective deformation and by providing the image by applying a variable perspective transformation to an originally generated image in response to said estimated current position O of the viewer, such that the viewer in said position O is enabled to watch the image without a perspective deformation.

15 Claims, 1 Drawing Sheet

METHOD AND APPARATUS FOR PROVIDING AN IMAGE TO BE DISPLAYED ON A SCREEN

The invention relates to a method and an apparatus for providing an image to be displayed on a screen, in particular on a TV screen or on a computer monitor, according to the preambles of claims 1, 12 and 16.

Such a method and apparatus are known in the art. However, in prior art it is also known that perspective deformations may occur when an image is displayed on a screen depending on the current position of a viewer watching the screen. That phenomenon shall now be explained in detail by referring to FIG. 3.

FIG. 3 is based on the assumption that a 2-dimensional image of a 3-dimensional scene is either taken by a camera, e.g. a TV camera or generated by a computer graphic program, e.g. a computer game. Moreover, an assumption is made about the location of the centre of the projection P and the rectangular viewport S of the original image, wherein P and S relate to the location where the original image is generated, e.g. a camera, but not necessarily to the location where it is later watched by a viewer. P and S are considered to form a fictive first pyramid as shown in FIG. 3. In the case that the image is taken with a camera, P is the optical centre of this camera and S is its light sensitive area. In the case that the image is generated by a computer graphic the parameters P and S can be considered as parameters of a virtual camera.

The original image might be generated by the camera or by the computer program by using different transformations known in the art:

One example for such a transformation is the change of the viewing point from which a particular scene is watched by the real or virtual camera.

Another example for such a transformation is the following one used in computer graphic applications for correcting texture mapping. Such a transformation may be described according to the following equation:

$$\begin{bmatrix} x \\ y \end{bmatrix} = \begin{bmatrix} au + bv + c \\ du + ev + f \end{bmatrix} \bigg/ (gu + hv + i) \quad (1)$$

wherein:

the term (gu+hv+i) represents a division per pixel;
u,v are the co-ordinates of a pixel of the image before transformation;
x,y are the co-ordinates of the pixel of the image after the transformation; and
a,b,c,d,e,f,g,h and i are variable coefficients being individually defined by the graphic program.

However, irrespective as to whether the original image has been generated by conducting such transformations or not or as to whether the image has been generated by a camera or by a computer program, there is only one spatial position Q in the location where the image is later watched after its generation, i.e. in front of a screen 10 on which the image is displayed, from which a viewer can watch the image on the screen without any perspective deformations.

Said position Q is fix in relation to the position of the screen 10 and can be calculated form the above-mentioned parameters P and S according to a method known in the art.

The position Q is illustrated in FIG. 3 as the top of a second fictive pyramid which is restricted by an rectangular area A of the image when being displayed on the screen 10. Said position Q, that means the ideal position for the viewer, is reached when the second fictive pyramid is similar to the first pyramid.

More specifically, the first and the second pyramid are similar if the following two conditions are fulfilled simultaneously:

a) Q lies on a line L which is orthogonal to the area A of the displayed image and goes through the centre of A; and
b) the distance between Q and the centre of A is such that the top angles of the two pyramids are equal.

If condition a) is not fulfilled there will be an oblique second pyramid; if condition b) is not fulfilled there will be an erroneous perspective shortening in case of occulsion, i.e. different objects of the original 3D scene get false relative apparent depths. The case that the condition a) is not fulfilled is more annoying to the viewer than the case that condition b) is not fulfilled.

Expressed in other words, if the current position O of the viewer watching the image on the screen 10 does not correspond to the position Q, i.e. if there is a distance |Q-O| between said positions Q and O, the viewer will see a perspectively deformed image. A large distance |Q-O | can result in reduced visibility of the displayed image and worse in reduced readability of text.

In prior art a suboptimal approach is known to overcome these disadvantages by adapting the displayed image to the current position of the viewer. More specifically, that approach proposes to rotate the physical screen by hand or by an electric motor such that condition a) is fulfilled; e.g. Bang & Olufsen sells a TV having a motor for rotating the screen.

According to that approach rotation of the screen is controlled in response to the distance |0-Q | between the position O of the viewer and the fix position Q. Rotation of the screen by hand is inconvenient for the viewer and the rotation by motor is expensive and vulnerable. Moreover, condition b) can not be fulfilled by that approach.

Starting from that prior art it is the object of the invention to improve a method and apparatus for providing an image to be displayed on a screen such that the application of the method is more convenient to a user or a viewer of the image.

Said object is solved by the method according to claim 1 comprising the steps of estimating the current spatial position O of a viewer in relation to a fixed predetermined position Q representing a viewing point in front of the screen from which the image could be watched without any perspective deformation; and providing the image by applying a variable perspective transformation to an originally generated image in response to said estimated current position O of the viewer.

Advantageously said perspective transformation enables a viewer in any current spatial position O in front of the screen to watch the image on the screen without perspective deformations. Consequently, the visibility of the displayed image and in particular the readability of displayed text is improved.

Said transformation is convenient to the viewer because he does not get aware of an application of the transformation when he is watching the images on the screen. There is no physical movement of the screen like in the prior art.

Moreover, the implementation of the transformation can be realised cheaply and usually no maintenance is required.

The application of said method is in particular helpful for large screen TV's or large monitors.

According to an embodiment of the invention the perspective transformation of the original image advantageously includes a rotation and/ or a translation of the co-ordinates of at least one pixel of the originally generated image. In that case an exact transformation of the position of the viewer into the ideal position Q can be achieved and perspective deformations can completely be deleted.

Preferably, the estimation of the position O of the viewer is done by tracking the head or the eye of the viewer.

Alternatively, said estimation is done by estimating the current position of a remote control used by the viewer for controlling the screen.

Preferably, the method steps of the method according to the invention are carried out in real-time because in that case the viewer is not optically disturbed when watching the image on the screen.

Further advantageous embodiments of the method according to the invention are subject matter of the dependent claims.

The object of the invention is further solved by an apparatus according to claim 12. The advantages of said apparatus correspond to the advantages outlined above with regard to the method of the invention.

Advantageously, the estimation unit and/or the correcting unit is included in a TV set or alternatively in a computer. In these cases, there are no additional unit required which would otherwise have to be placed close to the TV set or to the computer.

The object of the invention is further solved by the subject matter of claim 16, the advantages of which correspond the advantages of the apparatus described above.

In the following a preferred embodiments of the invention will be described by referring to the accompanying figures, wherein.

Figure 1:
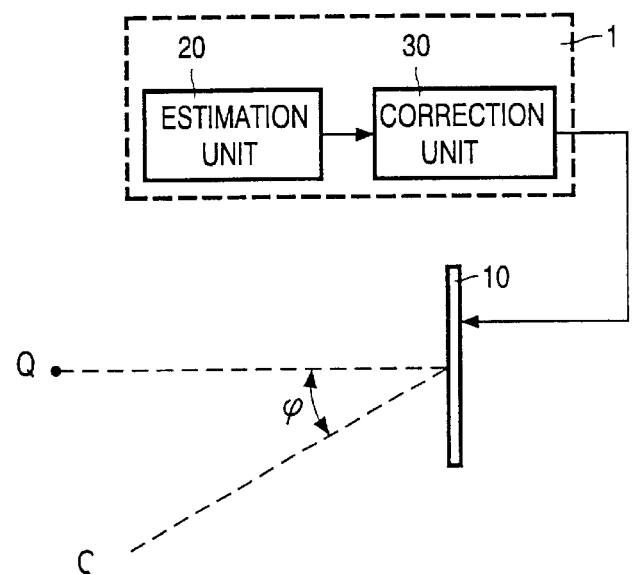
FIG. 1 shows an apparatuses for carrying out a method according to the invention.

FIG. 1 shows an apparatus 1 according to the present invention. It includes an estimation unit 20 for estimating the current spatial position O of a viewer in front of the screen 10 in relation to a fixed predetermined position Q representing a viewing point in front of the screen from which a provided image could be watched without any perspective deformation and for outputting a respective positioning signal.

The apparatus 1 further includes a correction unit 30 for providing the image by correcting the perspective deformation of an originally generated image in response to said estimated current position O and for outputting an image signal representing the provided image having no perspective deformation to the screen 10.

The correction unit 30 carries out the correction of the perspective deformation by applying a variable perspective transformation to the original image generated e.g. in a camera or by a computer graphic program.

The transformation is represented by formula (1) known in the art as described above. The usage of said transformation does not change a fix position Q from which the image can be watched after its generation without any perspective deformations.

It is important to note that the location where the original image is generated and the location where said image is later watched on a TV-screen or on a monitor are usually different. Moreover, at the time when the original image is generated a current or actual position O of a viewer in front of the screen when watching the image is not known and can thus not be considered when generating the original image.

Based on that situation the invention teaches another application of the known transformation according to equation 1. More specifically, according to the invention said transformation is used to enable a viewer to watch the image not only from the position Q but from any arbitrary position O in front of the screen 10 with only a minimal perspective deformation. In the case that the original image has been generated by conducting the transformation, the invention teaches an additional or second application of said transformation in order to generate the displayed image.

More specifically, according to the invention the variable coefficients a,b,c,d,e,f,g,h and i of said transformation are adapted in response to the currently estimated position O of the viewer. The transformation with the such adapted coefficients is subsequently applied to the original image in order to provide the image to be displayed on the screen. Said displayed image can be watched by the viewer from any position in front of the screen 10 without perspective deformations.

Figure 2:
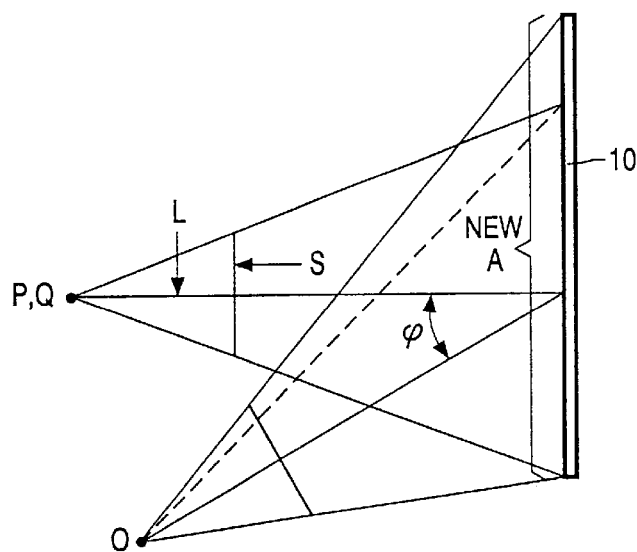
FIG. 2 illustrates the watching of an image on a screen without perspective deformations according to the invention.
Figure 3:
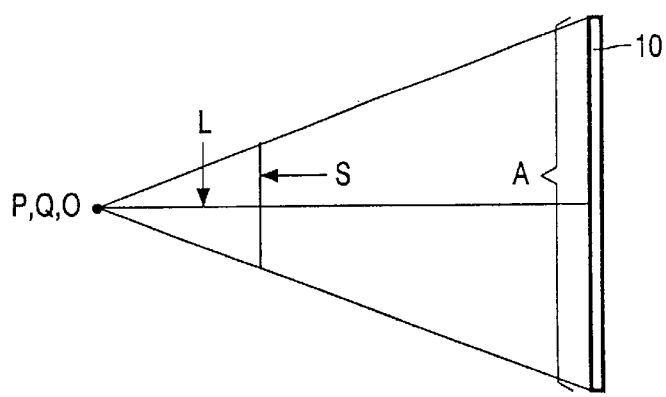
FIG. 3 illustrates the watching of an image on a screen from an ideal position Q without any perspective deformations as known in the art.

A method for carrying out the adaptation will now be explained in detail by referring to FIG. 2. In FIG. 2 a situation is shown in which a viewer watches the screen 10 from a position O which does not correspond to the ideal position Q. The meanings of the parameters A, L, S, O, P, Q in FIG. 2 correspond to their respective meanings as explained above by referring to FIG. 3. The method comprises the steps of:

1. Defining a co-ordinate system with Q as origin in which the x-axis lies in a horizontal direction, in which the y-axis lies in the vertical direction and in which the z-axis also lies in the horizontal direction leading from the position Q through the centre of the area A of the image displayed on the screen 10.

2. The parameters u and v as used in the transformation according to equation (1) relate to an only two-dimensional Euclidian co-ordinate system having its origin in the centre of the area A. For later being able to calculate the coefficients a-i of the transformation, the co-ordinates u and v are transformed from said two-dimensional Euclidian space into a three-dimensional Euclidian space having Q as origin according to the following equation:

$$\begin{pmatrix} u \\ v \end{pmatrix} \leftrightarrow \begin{pmatrix} u \\ v \\ L_d \end{pmatrix}, \quad (2)$$

wherein $L_d$ is the distance between the position Q and the centre of the image area A.

3. The co-ordinates $(u, v, L_d)$ of the displayed image in the three-dimensional Euclidian space are further transformed into a three-dimensional projective space having Q as origin according to $$\begin{pmatrix} u \\ v \end{pmatrix} \leftrightarrow \begin{pmatrix} u \\ v \\ L_d \end{pmatrix} \leftrightarrow \begin{pmatrix} u \\ v \\ L_d \\ 1 \end{pmatrix}. \quad (3)$$

4. Subsequently, an Euclidian transformation T is calculated to change the co-ordinate system such that the viewer position O is made the centre of the new co-ordinate system. Said Euclidian transformation T is in general calculated according to:

$$\begin{bmatrix} 0 \\ 0 \\ 0 \\ 1 \end{bmatrix} = \begin{bmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{bmatrix} \begin{bmatrix} x_0 \\ y_0 \\ z_0 \\ 1 \end{bmatrix} = T \begin{bmatrix} x_0 \\ y_0 \\ z_0 \\ 1 \end{bmatrix}, \quad (4)$$

wherein:

the vector $[x_0, y_0, z_0, 1]$ represents the co-ordinates of the position O of the viewer in the three-dimensional projective space having Q as origin, $R_{ij}$ with i=1–3 and j=1–3 represent the co-ordinates of a rotation matrix for rotating the co-ordinates, e.g. through $\phi$, $t_x$, $t_y$ and $t_z$ form a translation vector representing a translation of the co-ordinates, and the vector $[0, 0, 0, 1]$ represents the origin of the new co-ordinate system corresponding to the position O of the viewer.

5. The found transformation T is now applied to all the pixels of the rectangle area A, i.e. to the pixel co-ordinates of the displayed image, according to $$\begin{bmatrix} x_{TR} \\ y_{TR} \\ z_{TR} \\ 1 \end{bmatrix} = \begin{bmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{bmatrix} \begin{bmatrix} u \\ v \\ L_d \\ 1 \end{bmatrix} = T \begin{bmatrix} u \\ v \\ L_d \\ 1 \end{bmatrix}. \quad (5)$$

Equation 5 represents a transformation of the pixel co-ordinates $[u, v, L_d, 1]$ of the image on the screen in a co-ordinate system having Q as origin into the transformed pixel co-ordinates $[x_{TR}, y_{TR}, z_{TR}, 1]$ of said image into the co-ordinate system having the position O of the viewer as the origin. Both vectors $[u, v, L_d, 1]$ and $[x_{TR}, y_{TR}, zTR, 1]$ lie in the three-dimensional projective space.

6. In the next method step, the transformed pixel positions resulting from equation 5 are transformed by applying a perspective image transformation to them. Said perspective image transformation serves for transforming the transformed co-ordinates $[x_{TR}, y_{TR}, z_{TR}, 1]$ in the three-dimensional projective space into co-ordinates $[u_{new}, v_{new}, w_{new}]$ in a two-dimensional projective space according to:

$$\begin{bmatrix} u_{new} \\ v_{new} \\ w_{new} \end{bmatrix} = \begin{bmatrix} L_d & 0 & 0 & 0 \\ 0 & L_d & 0 & 0 \\ 0 & 0 & 1 & 0 \end{bmatrix} \begin{bmatrix} x_{TR} \\ y_{TR} \\ z_{TR} \\ 1 \end{bmatrix} \quad (6')$$

$$= \begin{bmatrix} L_d & 0 & 0 & 0 \\ 0 & L_d & 0 & 0 \\ 0 & 0 & 1 & 0 \end{bmatrix} \begin{bmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{bmatrix} \begin{bmatrix} u \\ v \\ L_d \\ 1 \end{bmatrix}; \quad (6'')$$

$$= \begin{bmatrix} L_d & 0 & 0 & 0 \\ 0 & L_d & 0 & 0 \\ 0 & 0 & 1 & 0 \end{bmatrix} \cdot \begin{bmatrix} R_{11}u + R_{12}v + R_{13}L_d + t_x \\ R_{21}u + R_{22}v + R_{23}L_d + t_y \\ R_{31}u + R_{32}v + R_{33}L_d + t_z \\ 1 \end{bmatrix} \quad (6''')$$

$$= \begin{bmatrix} R_{11}L_d u + R_{12}L_d v + R_{13}L_d^2 + L_d t_x \\ R_{21}L_d u + R_{22}L_d v + R_{23}L_d^2 + L_d t_y \\ R_{31}u + R_{32}v + R_{33}L_d + t_z \end{bmatrix} \quad (6^{IV})$$

$$\begin{bmatrix} L_d R_{11} & L_d R_{12} & L_d^2 R_{13} + L_d t_x \\ L_d R_{21} & L_d R_{22} & L_d^2 R_{23} + L_d t_y \\ R_{31} & R_{32} & L_d R_{33} + t_z \end{bmatrix} \begin{bmatrix} u \\ v \\ 1 \end{bmatrix} \quad (6^V)$$

$$\Leftrightarrow \begin{bmatrix} u_{new} \\ v_{new} \\ w_{new} \end{bmatrix} = \begin{bmatrix} a & b & c \\ d & e & f \\ g & h & i \end{bmatrix} \begin{bmatrix} u \\ v \\ 1 \end{bmatrix} \quad (6^{VI})$$

7. The vector $[u_{new}, v_{new}, w_{new}]$ in the two-dimensional projective space can be transformed into the vector $[x, y]$ in the two-dimensional Euclidian space according to $$\begin{bmatrix} u_{new} \\ v_{new} \\ w_{new} \end{bmatrix} \rightarrow \begin{bmatrix} u_{new}/w_{new} \\ y_{new}/w_{new} \end{bmatrix} = \begin{bmatrix} x \\ y \end{bmatrix} \quad (7)$$

8. Thus, equation $6^{VI}$ can—under consideration of equation 7-be transformed into the 2-dimensional Euclidian space according to:

$$\begin{bmatrix} x \\ y \end{bmatrix} = \begin{bmatrix} a & b & c \\ d & e & f \end{bmatrix} \begin{bmatrix} u \\ v \\ 1 \end{bmatrix} / [g \ h \ i] \begin{bmatrix} u \\ v \\ 1 \end{bmatrix} \quad (8')$$

$$= \begin{bmatrix} au + bv + c \\ du + ev + f \end{bmatrix} / [gu + hv + i] \quad (8'')$$

It is important to note that equation 8" corresponds to equation 1!!

9. Consequently, the variable coefficients a-i of the transformation according to equation 1 can be calculated by comparing equation $6^{VI}$, with equation $6^V$ according to:

$$\begin{bmatrix} a & b & c \\ d & e & f \\ g & h & i \end{bmatrix} \begin{bmatrix} L_d R_{11} & L_d R_{12} & L_d^2 R_{13} + L_d t_x \\ L_d R_{21} & L_d R_{22} & L_d^2 R_{23} + L_d t_y \\ R_{31} & R_{32} & L_d R_{33} + t_z \end{bmatrix}. \quad (9)$$

Method steps 1 to 9 and in particular equation 9 are in general known in the art from texture mapping in computer graphics application.

However, in difference to the prior art, according to the present invention the coefficients a-i according to equation 9 are calculated inter alia from the estimated current position of the viewer O in front of the screen 10 of a TV set or of a monitor.

Equation 9 represents an exact transformation including in general a rotation and a translation such that it compensates for any arbitrary position O of the viewer.

More specifically, $L_d$ is fix and the parameters $R_{ij}$, $t_x$, $t_y$ and $t_z$ can be calculated from the original image area A on the screen 10, from the position Q and from the estimated position O of the viewer. Further, having calculated the right side of equation 9, also the coefficients a-i of the perspective transformation on the left side of equation 9 are known.

In the following, two simple examples for applying the perspective transformation, i.e. for calculating the coefficients a-i, according to the present invention are provided.

In a first example it is assumed that a viewer O stays on the line L connecting the centre of the area A of the screen with the position Q in front of the screen. In that case a rotation of the image to be displayed is obsolete; only a translative transformation is required.

With equation 1 and the calculated coefficients a-i it is possible to compensate for an eye-position O of the viewer on the line L closer to the area A than to the position Q, but in that case some of the outer area of the received image is not displayed. Or it is possible to compensate for an eye-position O of the viewer on the line L further away from the area A than to the position Q, but in that case some of the outer area of the screen is not used.

In the second example, it is assumed that the viewer O does not stay on the line L but having a distance to the centre of the area A which corresponds to the distance between Q and said centre. Consequently, the translation tx, ty and tz coefficients in equation 9 can be ignored and only correction for the horizontal rotation needs to be considered. The required perspective transformation follows from the pyramid with O as top and with a line through the position O of the viewer and the centre of the screen as centre line.

According to FIG. 2 rotation around the position Q is required to get the position O of the viewer onto the line L, after the position O is projected on a horizontal plane through Q (thus, ignoring the y-co-ordinate of the position O ). This gives:

$$\begin{bmatrix} a & b & c \\ d & e & f \\ g & h & i \end{bmatrix} = \begin{bmatrix} L_d\cos\varphi & 0 & -L_d^2\sin\varphi \\ 0 & L_d & 0 \\ \sin\varphi & 0 & L_d\cos\varphi \end{bmatrix} \quad (10)$$

with $$\cos\varphi = z_0 / \left(\sqrt{x_0^2 + z_0^2}\right)$$

and $$\sin\varphi = x_0 / \left(\sqrt{x_0^2 + z_0^2}\right) \quad (11)$$

wherein $x_0$ and $z_0$ represent the co-ordinates of the viewer in the Euclidian space in a co-ordinate system having Q as origin.

The rotation around Q changes the distance to the centre of A, but after the rotation a scaling is required to avoid that either a part of the transformed image is outside the display screen or that a large part of the display screen is not used:

$$\begin{bmatrix} a & b & c \\ d & e & f \\ g & h & i \end{bmatrix} = \begin{bmatrix} s & 0 & 0 \\ 0 & s & 0 \\ 0 & 0 & 1 \end{bmatrix} \begin{bmatrix} L_d\cos\varphi & 0 & -L_d^2\sin\varphi \\ 0 & L_d & 0 \\ \sin\varphi & 0 & L_d\cos\varphi \end{bmatrix} \quad (12)$$

The scale factor can be computed by requiring that the perspective projections of the four corners of the original rectangle A are on the four boundaries of the rectangle:

$$\begin{bmatrix} x_{left} \\ y \end{bmatrix} = P(s, u_{left}, v_{bottom}) \quad (13)$$

$$\begin{bmatrix} x \\ y_{bottom} \end{bmatrix} = P(s, u_{left}, v_{bottom}) \quad (14)$$

$$\begin{bmatrix} x_{left} \\ y \end{bmatrix} = P(s, u_{left}, v_{top}) \quad (15)$$

$$\begin{bmatrix} x \\ y_{top} \end{bmatrix} = P(s, u_{left}, v_{top}) \quad (16)$$

$$\begin{bmatrix} x_{right} \\ y \end{bmatrix} = P(s, u_{right}, v_{bottom}) \quad (17)$$

$$\begin{bmatrix} x \\ y_{bottom} \end{bmatrix} = P(s, u_{right}, v_{bottom}) \quad (18)$$

$$\begin{bmatrix} x_{right} \\ y \end{bmatrix} = P(s, u_{right}, v_{top}) \quad (19)$$

$$\begin{bmatrix} x \\ y_{top} \end{bmatrix} = P(s, u_{right}, v_{top}) \quad (20)$$

with P(s,u,v) being a rational perspective transformation derived from the right side of equation 12 in the same way as equation 8' is derived from equation $6^{VI}$. The variables u and v are 2-dim. Euclidean co-ordinates of positions on the screen.

This gives eight scale factors si i=1–8. The smallest one should be used as the final or optimal scale factor in equation 12 ensuring that the area of the transformed image completely fits into the area of the screen on which it shall be displayed.

The co-ordinates x and y on both sides of equations 13 to 20 represent co-ordinates of the image area A in the two-dimensional Euclidian space. Equations 13 to 20 express conditions or requirements for the position of the corners of a new area Anew of the image after transformation. E.g. in equation 13 it is required that the x-co-ordinate of the corner of the original rectangle A represented by the co-ordinates $x_{left}$ and $y_{bottom}$ is kept identical after transformation.

Returning back to equation 1 and FIG. 2 it shall be pointed out that an application of the perspective transformation according to equation 1 onto an originally generated image ensures that the pyramid formed by the position Q and the original area A of the image on the screen 10 is similar to the pyramid formed by the transformed area $A_{new}$ of the image and the estimated position O of the viewer. This is illustrated in FIG. 2.

The proposed solution may be implemented in future TV's which are extended with means for special grapic effects inclusive cheap hardware for carrying out the required calculations according to the invention with only little additional costs.

What is claimed is:

1. Method for providing an image to be displayed on a screen (10), in particular on a TV screen or on a computer monitor, the method being characterized by the following steps of:
   estimating a current spatial position O of a viewer in relation to a fixed predetermined position Q representing a viewing point in front of the screen (10) from which the image could be watched without any perspective deformation; and
   providing the image by applying a variable perspective transformation to an originally generated image in response to said estimated current position O of the viewer, such that the viewer in said position O is enabled to watch the image without a perspective deformation.

2. The method according to claim 1, characterized in that the transformation is carried out according to the following formula:

$$\begin{bmatrix} x \\ y \end{bmatrix} = \begin{bmatrix} au + bv + c \\ du + ev + f \end{bmatrix} \bigg/ (gu + hv + i)$$

wherein:
   u,v are the co-ordinates of a pixel of the original image before transformation;
   x,y are the co-ordinates of the pixel of the provided image after the transformation; and a,b,c,d,e,f,g,h and i are variable coefficients defining the transformation and being adapted in response to the estimated current position O of the viewer.

3. The method according to claim 1, characterized in that the image comprises at least one pixel.

4. The method according to claim 1, characterized in that the transformation comprises a rotation and/or a translation of the co-ordinates of the at least one pixel of the image.

5. The method according to claim 4, characterized in that the variable coefficients a,b,c,d,e,f,g,h and i are calculated according to:

$$\begin{bmatrix} a & b & c \\ d & e & f \\ g & h & i \end{bmatrix} = \begin{bmatrix} L_d R_{11} & L_d R_{12} & L_d^2 R_{13} + L_d t_x \\ L_d R_{21} & L_d R_{22} & L_d^2 R_{23} + L_d t_y \\ R_{31} & R_{32} & L_d R_{33} + t_z \end{bmatrix}$$

wherein:

$L_d$ is the fixed distance between the position Q and the centre of an area A of the image when being displayed on the screen;

$R_{ij}$ with i=1-3 and j=1-3 are the coefficients of a rotation matrix for rotating the pixels;

$t_x$, $t_y$ and $t_z$ are the coefficients of a translation vector;

and wherein the rotation matrix and the translation vector are calculated according to the estimated current spatial position O of the viewer in relation to the position Q.

6. The method according to claim 5, characterized in that in the case that the translation is ignored and that rotation is considered to take place only in a plane defined by the positions O, Q and a line L connecting Q and being orthogonal to the area A of the displayed image on the screen, the variable coefficients a,b,c,d,e,f,g,h and i are calculated according to:

$$\begin{bmatrix} a & b & c \\ d & e & f \\ g & h & i \end{bmatrix} = \begin{bmatrix} L_d \cos\varphi & 0 & -L_d^2 \sin\varphi \\ 0 & L_d & 0 \\ \sin\varphi & 0 & L_d \cos\varphi \end{bmatrix}$$

wherein:

$R_{11}=R_{33}=\cos\phi$, $R_{13}=-\sin\phi$, $R_{31}=\sin\phi$; and $t_x=t_y=t_z=0$ with:

$$\cos\varphi = z_0 \Big/ \sqrt{x_0^2 + z_0^2} \text{ and } \sin\varphi = x_0 \Big/ \sqrt{x_0^2 + z_0^2}$$

wherein $x_0$ and $z_0$ are co-ordinates of the viewer position in a co-ordinate system having Q as origin.

7. The method according to claim 6, characterized in that the step of calculating the variable coefficients a,b,c,d,e,f,g,h and i further comprises a scaling of the coefficients with a scale factor s according to:

$$\begin{bmatrix} a & b & c \\ d & e & f \\ g & h & i \end{bmatrix} = \begin{bmatrix} s & 0 & 0 \\ 0 & s & 0 \\ 0 & 0 & 1 \end{bmatrix} \begin{bmatrix} L_d \cos\varphi & 0 & -L_d^2 \sin\varphi \\ 0 & L_d & 0 \\ \sin\varphi & 0 & L_d \cos\varphi \end{bmatrix} = P(s).$$

8. The method according to claim 7, characterized in that an optimal scale factor which is chosen such that the provided image completely fits into the area of the screen is determined by carrying out the following steps:

calculating preliminary scale factors si i=1-8 by solving the following 8 linear equation systems:

$$\begin{bmatrix} x_{left} \\ y \end{bmatrix} = P(s, u_{left}, v_{bottom}); \quad \begin{bmatrix} x \\ y_{bottom} \end{bmatrix} = P(s, u_{left}, v_{bottom})$$

$$\begin{bmatrix} x_{left} \\ y \end{bmatrix} = P(s, u_{left}, v_{top}); \quad \begin{bmatrix} x \\ y_{top} \end{bmatrix} = P(s, u_{left}, v_{top})$$

$$\begin{bmatrix} x_{right} \\ y \end{bmatrix} = P(s, u_{right}, v_{bottom}); \quad \begin{bmatrix} x \\ y_{bottom} \end{bmatrix} = P(s, u_{right}, v_{bottom})$$

$$\begin{bmatrix} x_{right} \\ y \end{bmatrix} = P(s, u_{right}, v_{top}); \quad \begin{bmatrix} x \\ y_{top} \end{bmatrix} = P(s, u_{right}, v_{top})$$

wherein the x,y vectors on the right side of each of said linear systems represent the fictive co-ordinates of a corner of the original image on the screen, wherein the x,y vectors on the left side respectively represents the co-ordinate of a corner of the provided image actually displayed on the screen, and wherein the co-ordinates $x_{right}$, $x_{left}$, $y_{bottom}$ and $y_{top}$ are predetermined; and selecting the minimal one of said calculated preliminary scale factors si as the optimal scale factor.

9. The method according to claim 1, characterized in that the estimation is done by tracking the head or the eye of the viewer.

10. The method according to claim 1, characterized in that the estimation of the position O is done by estimating the current position of a remote control used by the viewer for controlling the screen.

11. The method according to claim 1, characterized in that the steps of the method are carried out in real-time.

12. Apparatus (1) for providing an image to be displayed on a screen (10), in particular on a TV screen or on a computer monitor, the apparatus is characterized by:

an estimation unit (20) for outputting a positioning signal representing an estimation of a current spatial position O of a viewer in front of the screen (10) in relation to a fixed predetermined position Q representing a viewing point from which the image on the screen (10) can be watched without any perspective deformation; and a correcting unit (30') for applying a variable perspective transformation to an originally generated image in response to said positioning signal such that the viewer in the position O is enabled to watch the image without said perspective deformation.

13. The apparatus according to claim 12, characterized in that the transformation is represented by the following formula:

$$\begin{bmatrix} x \\ y \end{bmatrix} = \begin{bmatrix} au + bv + c \\ du + ev + f \end{bmatrix} \Big/ (gu + hv + i) \quad (1)$$

wherein:

u,v are the co-ordinates of a pixel of the original image before transformation;

x,y are the co-ordinates of the pixel of the provided image after the transformation; and a,b,c,d,e,f,g,h and i are variable coefficients defining the transformation and being adapted in response to the estimated current position O of the viewer such that the viewer in any current spatial position O is enabled to watch the image on the screen (10) without perspective deformations.

14. The apparatus (1) according to claim 13, characterized in that the estimation unit and/or the correcting unit is included in a TV set.

15. The apparatus (1) according to claim 14, characterized in that the estimation unit and/ or the correcting unit is included in a computer.

* * * * *